United States Patent [19]

Keen, Jr.

[11] 4,214,119

[45] Jul. 22, 1980

[54] CORROSIVE RESISTANT SEAL FOR EPOXY SHELL BUSHINGS, METHOD OF PROVIDING SAME, AND GASKET THEREFOR

[75] Inventor: William A. Keen, Jr., Cheshire, Mass.

[73] Assignee: General Electric Company

[21] Appl. No.: 902,492

[22] Filed: May 3, 1978

[51] Int. Cl.[2] ........................ H01B 17/30; F16J 15/10

[52] U.S. Cl. .................................... 174/31 R; 174/18; 277/58; 277/228; 277/229; 277/DIG. 6

[58] Field of Search ........ 174/11 BH, 12 BH, 14 BH, 174/15 BH, 16 BH, 17 CT, 18, 31 R, 142, 143, 152 R, 153 R, 167; 277/1, 12, 58, 125, 167.3, 228, 229, DIG. 6

[56] References Cited

U.S. PATENT DOCUMENTS

| | | | |
|---|---|---|---|
| 2,597,976 | 5/1952 | Cousins | 277/228 |
| 2,717,025 | 9/1955 | Jelinek | 277/228 X |
| 2,774,621 | 12/1956 | Kilbourne, Jr. | 277/DIG. 6 X |
| 3,118,966 | 1/1964 | Yeckley et al. | 174/31 R X |
| 3,968,022 | 7/1976 | Eng et al. | 277/125 X |

FOREIGN PATENT DOCUMENTS

| | | | |
|---|---|---|---|
| 972835 | 8/1975 | Canada | 174/143 |

*Primary Examiner*—Laramie E. Askin

*Attorney, Agent, or Firm*—Francis X. Doyle; Richard A. Menelly

[57] ABSTRACT

High voltage bushings for use within $SF_6$ circuit breakers are provided with a tandem arrangement of an outer acid resistant gasket and an inner gas impervious gasket to prevent contact between the bushing oil and the $SF_6$ gas.

3 Claims, 4 Drawing Figures

CORROSIVE RESISTANT SEAL FOR EPOXY SHELL BUSHINGS, METHOD OF PROVIDING SAME, AND GASKET THEREFOR

BACKGROUND OF THE INVENTION

This invention relates to high voltage feed-through bushings in general and in particular to those types of bushings used with circuit breakers.

Circuit breaker devices of the type containing sulfur hexafluoride gas ($SF_6$) can contain a measureable quantity of hydrofluoric acid. The constant arcing of the circuit breaker electrodes provides sufficient energy to dissociate the $SF_6$ gas and, in the presence of moisture, generate hydrofluoric acid. When bushings are used as high voltage feed-throughs for $SF_6$ circuit breakers, a material other than porcelain or glass must be employed due to the corrosive effects of the hydrofluoric acid on the porcelain and glass materials. One material which is an effective substitute for porcelain in $SF_6$ circuit breakers is epoxy resin. The hydrofluoric acid within the breaker has no deleterious effect on the epoxy material.

The hydrofluoric acid within the breaker also has a deleterious effect on the rubber gaskets used to provide a gas-tight connection between the bushing and the breaker and between the busing housing and the bushing bottom high voltage terminal. Materials which were found to be resistive to hydrofluoric acid were found to be ineffective materials for use as gaskets due to high gas permeability. Gaskets made from hydrofluoric acid-resisting materials allowed the $SF_6$ gas to leak from the breaker.

The purpose of this invention is to provide methods and materials for forming gas-tight seals between epoxy bushings and $SF_6$ circuit breakers which are corrosive resistant to hydrofluoric acid and are impermeable to sulfur hexafluoride gas.

SUMMARY OF THE INVENTION

One method for forming gas-tight corrosive resistant seals between high voltage bushings and $SF_6$ circuit breakers is to provide a tandem arrangement of gaskets between the dielectric oil of the bushing and the $SF_6$ gas of the circuit breaker. In one embodiment of the invention the tandem arrangement comprises two gaskets wherein the gasket proximate the $SF_6$ gas consists of a Viton rubber and the gasket proximate the dielectric oil comprises a nitrile rubber.

GENERAL DESCRIPTION OF THE INVENTION

Figure 1:
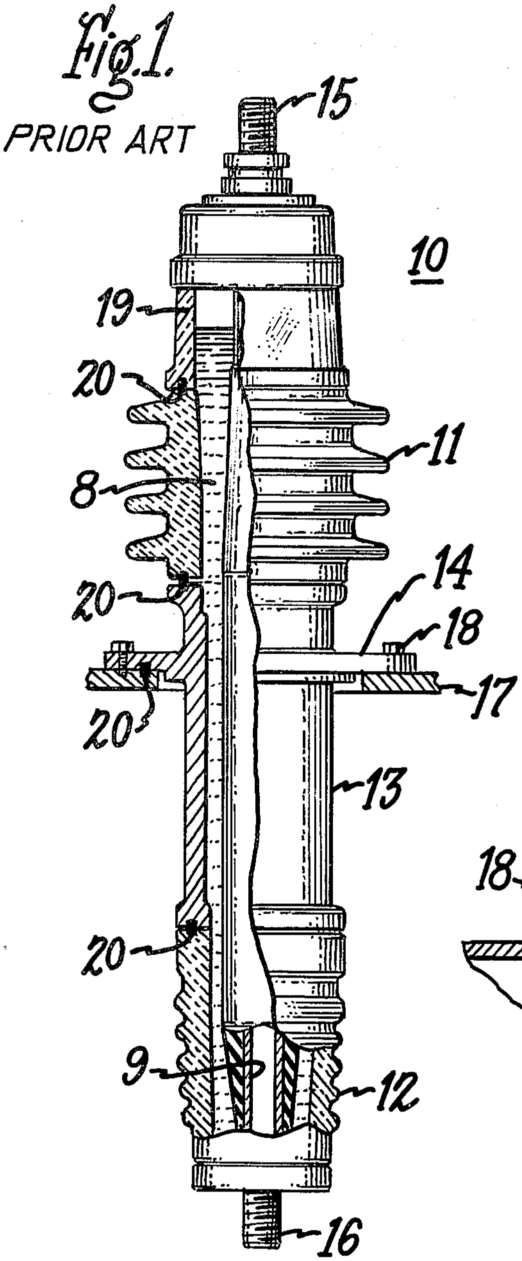
Fig.1. PRIOR ART
FIG. 1 is a front view in partial section of a prior art high voltage bushing.

FIG. 1 contains a prior art bushing 10 of the type having a top porcelain portion 11 and bottom porcelain portion 12 separated by a metal support body member 13. The bushing arrangement containing the metal support body 13 intermediate the top and bottom porcelain portions is generally used with transformers wherein the bushing is attached to the transformer casing by means of support flange 14 and bolts 18 attached to a section of the transformer tank 17. The bushing also contains a metal conductor tube 9 extending concentrically within the bushing and providing electrical continuity between a top and bottom terminal connection 15, 16. In order to cool the metal tube and to provide a dielectric medium within the bushing enclosure a quantity of dielectric oil 8 is usually disposed within the interior portion of the bushing. In order to observe the bushing oil 8 within the bushing enclosure a sight glass 19 is generally provided at the top portion of the top porcelain portion of the bushing. In order to form hermetic seals between the bottom porcelain portion and the metal support, between the metal support and the transformer casing, and between the metal support and the top porcelain housing, a plurality of O-ring gaskets 20 is required. In order to hermetically seal the sight glass 19 to top porcelain portion 11 an O-ring gasket 20 is also required. Since the dielectric oil within the transformer has no effect on porcelain material, the entire bushing including the top portion 11 and bottom portion 12 are generally fabricated from porcelain. Other materials such as glass can also be employed since the dielectric oils used within both the bushing and the transformer have no effect on the glass composition.

Figure 2:
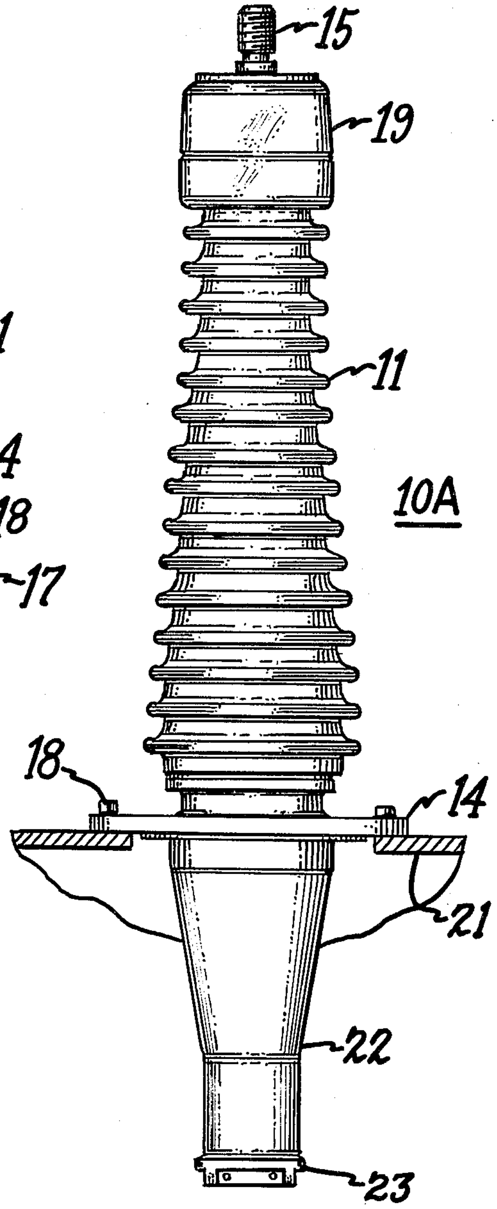
FIG. 2 is a bushing for use within $SF_6$ circuit breakers having a porcelain top portion and an epoxy bottom portion.

When bushings are used within electrical devices employing $SF_6$ gas for dielectric and arc-inhibiting properties, porcelain and glass compositions can not be used. The $SF_6$ gas partially decomposes into hydrofluoric acid which dissolves the aforementioned compositions. FIG. 2 shows a bushing 10A designed especially for use with electrical devices employing $SF_6$ gas. Since the top portion 11 of the bushing is exposed to air, the top portion can be fabricated from porcelain and can contain the usual sight glass 19 and top terminal connection 15. The bushing is attached to the electrical device by means of flange 14 and bolt 18 in the usual manner. When the bushing is to be used with an $SF_6$ circuit breaker, the flange is attached to an opening in the body 21 of the circuit breaker. Since the circuit breaker contains $SF_6$, gas the bottom portion 22 of the bushing is made of a material other than porcelain or glass. In the embodiment of FIG. 2 the bottom portion 22 is generally fabricated from an epoxy compound with a metal lip 23 at one end for attachment to the bottom terminal contact. When gas-tight seals are made between the inner metal conductor and the bottom metal lip 23 using standard nitrile rubber O-ring gaskets, it was discovered that the gasket became ineffective after a period of exposure to the corrosive by-products of the $SF_6$ gas. Other rubber compounds such as Viton rubber which is a fluoroelastomer based on the copolymer of vinylidine fluoride and hexafluoropropylene have excellent corrosive resistant properties but are permeable to gases. A direct substitution of the Viton rubber for nitrile is inoperative within $SF_6$ circuit breakers because of the diffusion of the $SF_6$ gas through the Viton material. The nitrile rubber formed by the polymerization of acrylonitrile with butadiene has excellent resistance to gas permeability but fails in the presence of hydrofluoric acid for the reasons discussed earlier.

The use of non-rubber compounds such as nylon and Teflon for O-ring bushing materials has heretofore proven infeasible because of the inherent inflexibility of these compounds. For use as an O-ring gasket the selected material must be compressible as well as gas and liquid impermeable. An expeditious solution to the problem of overcoming the corrosive susceptibility of nitrile O-ring gaskets and the gas permeability inherent within Viton rubber O-ring gaskets is provided by the following combination.

DESCRIPTION OF THE PREFERRED EMBODIMENT

Figure 3:
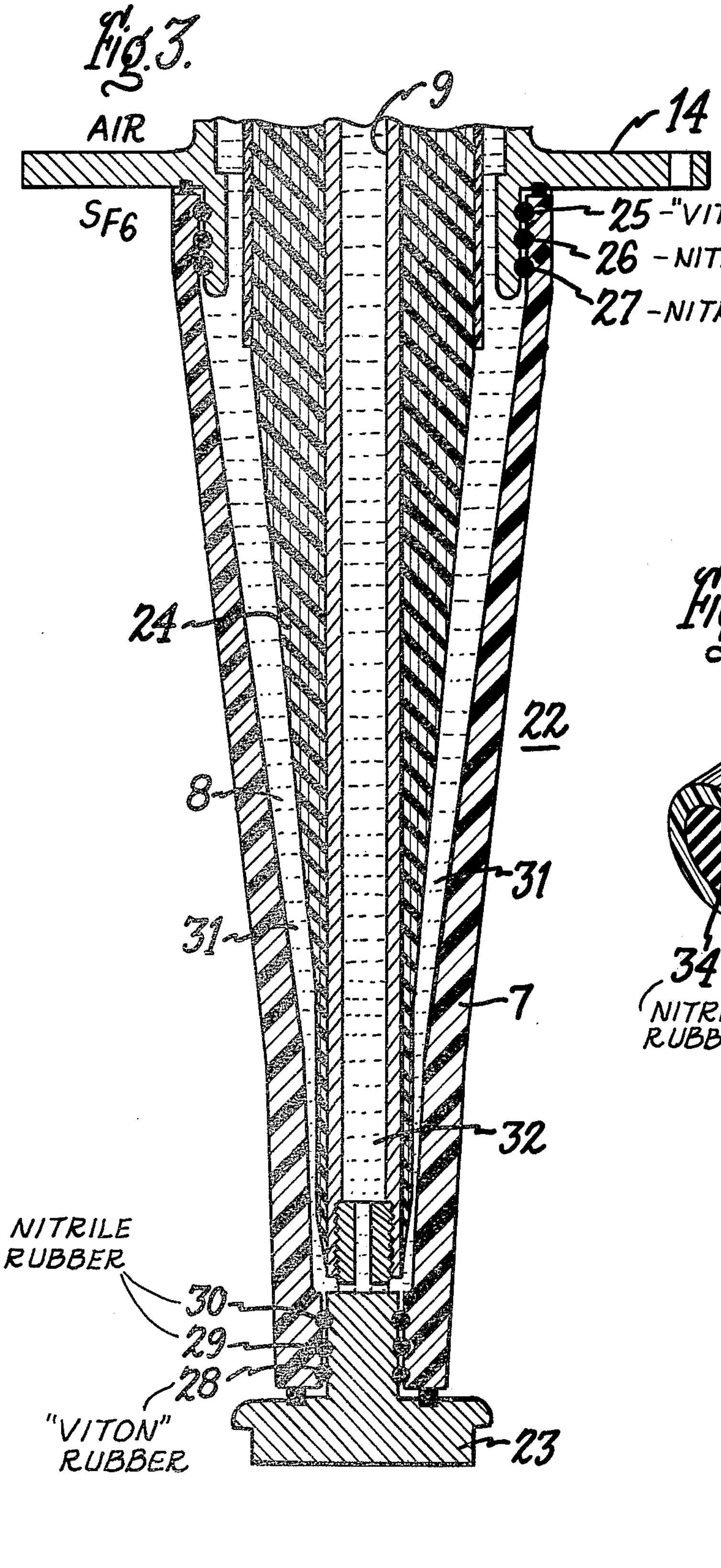
FIG. 3 is a side sectional view of the epoxy portion of the bushing of FIG. 2 containing the gasket arrangement according to the invention.

The bottom portion 22 of the bushing 10A of FIG. 2 is shown in greater detail in FIG. 3. The bottom portion 22 includes a metal tube 9 extending concentrically through both the top and bottom portions which is cooled by an outer oil channel 31 and an inner oil channel 32. The dielectric oil generally employed comprises a mineral oil. The bottom portion further includes a layer of paper insulation 24 around the metal tube and a plurality of gaskets 25–30 which will now be described in detail. The first gasket 25 is used to provide a hermetic seal between the epoxy housing 7 and the bushing flange 14 at the exterior junction between the flange and the housing. The second gasket 26 provides a hermetic seal between the inner portion of the housing and the inner portion of the flange. The combination of nitrile rubber and Viton rubber O-ring gaskets for use within the bottom bushing portion is arranged as follows. The first gasket 25, made of Viton rubber, serves to hermetically seal between flange 14 and epoxy housing 7. The second gasket 26, of nitrile rubber, adjacent to the first gasket and opposite from flange 14 prevents oil from within the outer chamber 31 from escaping out through the flange-housing interface. For the purposes of this disclosure the region in FIG. 3 above flange 14 is designated as the "air" side of the flange and the region under flange 14 is as designated as the "$SF_6$" side of the flange. When the bushing is connected to an $SF_6$ circuit breaker as shown in FIG. 2, the entire bottom portion 22 is completely encompassed within the $SF_6$ gas. It is an important feature of this invention therefore that the first gasket 25 herein designated as the "outer" gasket be comprised of a material that is corrosive resistant to hydrofluoric acid. As described earlier, the Viton rubber material is at least partially pervious to gas flow so that the second gasket 26 hereafter called the "inner" gasket further prevents the $SF_6$ gas from interacting with the oil contained within chamber 31. It is to be noted that the inner gasket 26 also serves to prevent the oil within chamber 31 from leaking out to within the ambient of the $SF_6$ circuit breaker or to the atmosphere. In the embodiment of FIG. 3 a third gasket 27 made of nitrile rubber is also included as a further means for preventing $SF_6$ gas from entering to within the oil chamber 31. A further plurality of Viton and nitrile gaskets can be employed; however, the outer gasket must comprise a material which is resistant to the corrosive effects of HF acid fumes. A corresponding plurality of inner gaskets can be employed providing the inner gaskets are impervious to both gases and liquids. It is within the scope of this invention to use at least one outer Viton rubber gasket and at least one inner nitrile rubber gasket in order to provide adequate seals between the circuit breaker fill gas and the dielectric oil used within the bushing.

A similar arrangement of non-corrosive and fluid impervious gaskets must be provided in the vicinity of the metal lip 23 and the bottom portion of the metal conductor tube 9. Although the metal tube 9 is shown open at the bottom thereof, this is for purposes of description only. The metal lip and metal tube are closed to the $SF_6$ atmosphere within the circuit breaker by means of a bottom electrode connection similar to the prior art bushing device depicted in FIG. 1. A fourth gasket 28 of Viton rubber material comprises the outermost gasket chosen of a Viton rubber material to resist the corrosive effects of HF acid as described earlier. The fifth gasket 29 of nitrile rubber serves as the inner gasket in order to prevent the mineral oil within chamber 31 from leaking out to within the circuit breaker. A sixth gasket 30 of nitrile rubber is included as an added means for preventing the oil from within chamber 31 from leaking to within the circuit breaker enclosure. Although the sixth gasket of nitrile rubber is used for added sealing purposes, this is not a necessary element of the invention and it is to be clearly understood that any number of fluid impervious and corrosive-resistant gaskets can be employed depending upon the degree of certainty required for the resulting seals.

Figure 4:
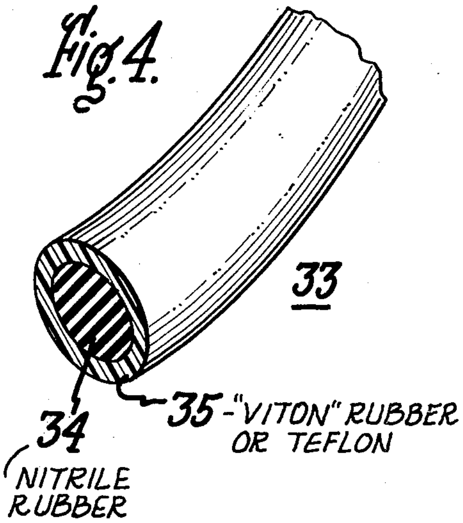
FIG. 4 is a perspective view in partial section of a compound gasket for use within the bushing of FIG. 2.

The method of the invention therefore employs an outer Viton rubber gasket in combination with an inner nitrile rubber gasket at both ends of the bottom portion of the bushing to prevent any seepage of the oil out from the bushing and any diffusion of $SF_6$ gas from the breaker to within the bushing. A single combination gasket having the multi-functional property of good corrosion resistance to HF acid and impermeability to mineral oil dielectrics and $SF_6$ gas can comprise a compound gasket 33 as shown in FIG. 4. The inner region 34 comprises nitrile rubber and the outer cladding 35 comprises Viton rubber. Providing that the outer cladding 35 is relatively small compared to the inner region 34, a single compound gasket can be employed in place of the inner and outer gaskets depicted in the embodiment of FIG. 3. The purpose of keeping the Viton cladding small is to provide corrosion resistance to the gasket without providing an appreciable cross section for the transport of $SF_6$ gas. A further material for cladding the compound gasket of FIG. 4 comprises Teflon. The Teflon coating would therefore provide HF resistant properties to compound gasket 33 wherein the nitrile rubber substrate 34 would provide sufficient fluid imperviousness to insure no leakage of the bushing oil or of the $SF_6$ gas.

Although the embodiments of the instant invention are disclosed for the purpose of providing a seal between high voltage bushings and $SF_6$ circuit breakers, this is by way of example only. The gasket arrangement of the invention finds application wherever bushings are to be employed within any electrical device containing a potentially corrosive atmosphere.

I claim:

1. A high voltage oil-filled bushing for use with an enclosure containing a fluid comprising:

- a top porcelain portion and a bottom epoxy portion;
- a connecting flange at one end and a metal lip at an opposite end of the bottom portion;
- a paper wound metal conducting tube concentrically located within the top and bottom portions;
- at least one acid resistant fluoroelastomer rubber outer gasket and at least one fluid impervious nitrile rubber inner gasket at the flange end of the bottom portion for preventing contact between the oil and the fluid at the flange end of the bottom portion; and
- at least one acid resistant fluoroelastomer rubber outer gasket and at least one fluid impervious nitrile rubber inner gasket at the metal lip end of the bottom portion for preventing contact between the oil and the fluid at the metal lip end of the bottom portion.

2. The bushing of claim 1 wherein the acid resistant fluoroelastomer rubber gasket comprises a copolymer of vinylidene fluoride and hexafluoropropylene.

3. The bushing of claim 1 wherein the fluid impervious nitrile rubber comprises butadiene polymerized acrylonitrile.

* * * * *